UNITED STATES PATENT OFFICE.

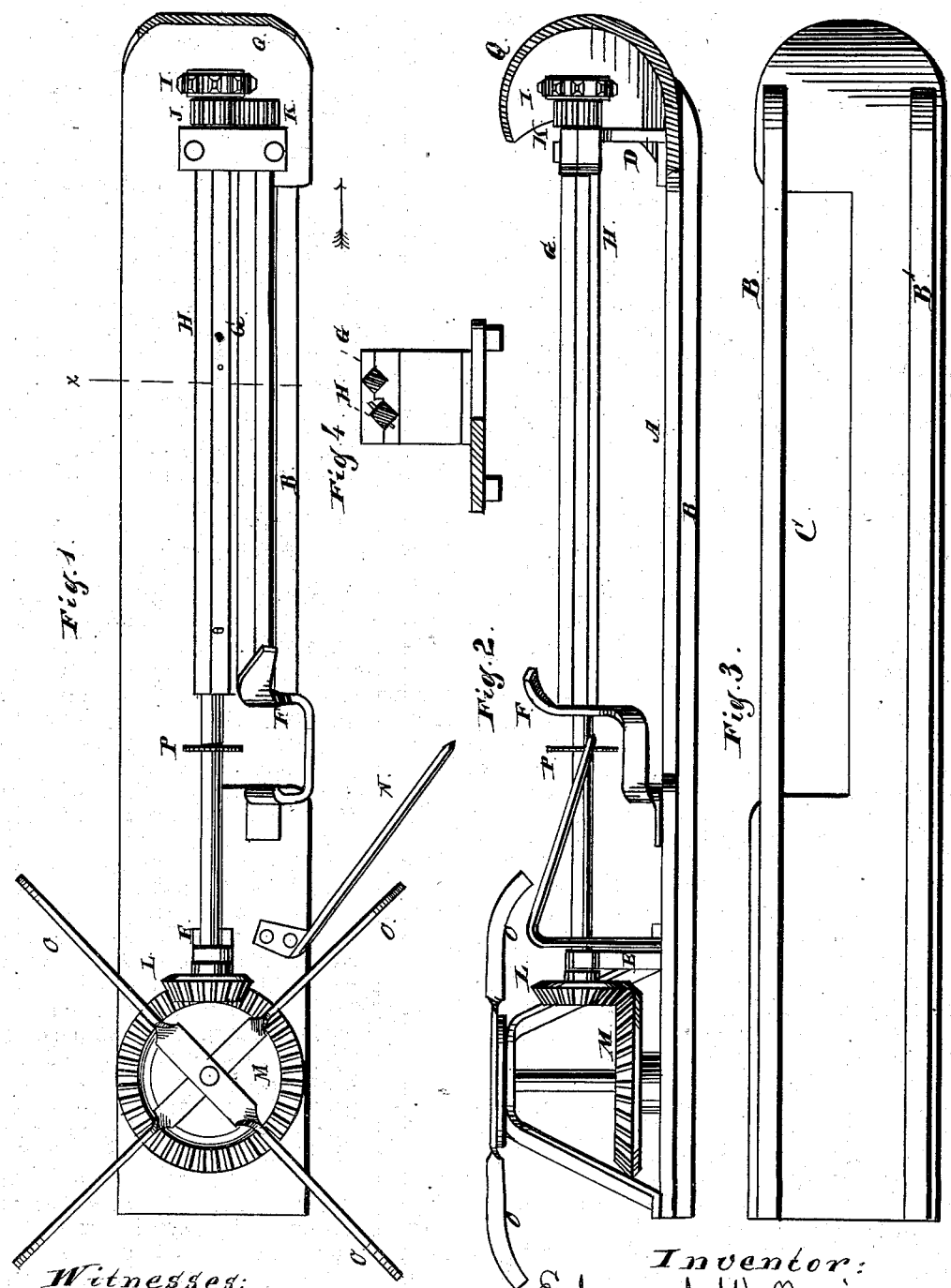

EDMUND W. QUINCY, OF PEORIA, ILLINOIS.

CORN-HARVESTER.

SPECIFICATION forming part of Letters Patent No. 252,328, dated January 17, 1882.

Application filed July 23, 1881. (No model.)

To all whom it may concern:

Be it known that I, EDMUND W. QUINCY, residing at Peoria, in the county of Peoria and State of Illinois, and a citizen of the United States, have invented new and useful Improvements in Corn-Harvesters, of which the following is a full description, reference being had to the accompanying drawings, in which—

Figure 1 is a top view. Fig. 2 is a side elevation. Fig. 3 is a bottom view of the parts shown. Fig. 4 is a cross-section at line $x$ of Fig. 1.

This invention relates to improvements in corn-harvesting machines; and it consists, essentially, in picking-rollers arranged parallel, or nearly parallel, with the rows of corn and to pass by the side of such rows, and means whereby the stalks are brought first to the rear ends of the picking-rollers.

The invention further consists in the combination of picking-rollers arranged to be in use parallel, or nearly so, with the rows of corn, a saw or other suitable means for severing the stalks, located at the rear of said picking-rollers, and means by which the stalks are presented to the rear ends of the picking-rollers.

The invention embraces other features, which will be fully hereinafter described, and pointed out in the claims.

In the drawings, A represents a main plate or bed made of any suitable material, having, as shown, two shoes or runners, B B', on the under side. A portion of this bed is cut away, leaving an open space, C.

D is a short standard secured to the bed A, near the front end, in which are the bearings for the front ends of the picking-rollers.

E is another short standard, near the rear of the bed A, in which the rear end of one of the picking-rollers is supported. The rear end of the other picking-roller is supported in a bearing in the standard F.

G H are two picking-rollers. G is about two feet in length. The whole length of H is about three feet; but only about two feet in length of this roller H act in connection with the roller G. As shown, that part of these picking-rollers which acts on the corn is square; but they may be round or of other suitable form.

The roller G is placed a little higher than H.

Upon the front end of the roller H is a sprocket-wheel, I, and a small pinion, J, which engages with a pinion, K, on the roller G.

L is a bevel-gear wheel on the rear end of the roller H, which engages with the bevel-wheel M.

N is an arm supported on the bed A and standing at an angle thereto.

O are arms supported on the top of a short shaft secured to the wheel M.

P is a small circular saw secured to the roller H.

Q is a guard to protect the wheels upon the front ends of the rollers G H from weeds and other substances.

$a$ are pins on the rollers H and G.

I have not shown means for giving motion to the described mechanism. This can be done in any suitable manner. In practice it is probable that the devices shown will be permanently connected to some suitable driving mechanism, which will be drawn through the field. The devices shown might be temporarily secured to a mowing-machine, the roller H being driven by means of a chain from the crank-wheel of the mower to the sprocket-wheel I on H.

The operation is as follows: The machine is to be drawn through the field by the side of a row of corn, motion being given to the roller H, and from it to the other moving parts. As the machine passes along, the arm N will catch and gather the standing corn, bending the stalks over toward the roller H. Then this arm N will pass over the stalks, forcing them down against the saw P, by which they will be severed below the ears. At the same time the severed stalks will be caught by the picking-rollers G H, which rotate in opposite directions, and the stalks will be carried down between the rollers; but the ears will be broken from the stalks and will be partially husked, and the roller G being higher than H, the ears will be thrown off upon the side of the machine away from the row of corn. The pins $a$ on the roller aid in forcing the stalks between the rollers. The stalks, after the ears have been removed, will fall to the ground through the open space C in the bed A, and the machine will pass over them.

The form and position of the standard F are such that it aids in guiding the stalks between the rollers.

The construction is such that the rollers and other operative parts are near the ground, which is an advantage. The stalks being severed, but little power will be required to force them between the rollers.

I have devised a second pair of husking-rollers to be arranged by the side of and a little below the picking-rollers, and also means for elevating the husked ears to a suitable receptacle; but these improvements will be described in a subsequent application.

Instead of the saw P, knives could be used for severing the stalks, which knives might be secured to the roller H at any suitable point.

Instead of supporting the picking-rollers on the bed-piece A, they might be supported by the frame-work of the driving mechanism.

What I claim as new, and desire to secure by Letters Patent, is—

1. In a corn-harvester, the picking-rollers G H, arranged parallel, or nearly parallel, with the rows of corn and to pass by the side of such rows, and means whereby the stalks are brought first to the rear end of the picking rollers, substantially as described.

2. In a corn-harvester, the combination of the picking-rollers, arranged as described, the saw P, or other suitable mechanism, for severing the stalks, located at the rear of said picking-rollers, and means by which the stalks are presented to the rear ends of such rollers, substantially as specified.

3. The combination, in a corn harvester, of the picking-rollers, arranged as described, and the gathering-arm N, for the purpose of bending the stalks inward and downward and bringing them to the rear ends of the picking-rollers, substantially as specified.

4. In a corn-harvester, the combination of the picking-rollers G H with a gathering device and suitable cutting mechanism, arranged substantially as set forth, for the purpose of bringing the stalks to the rear ends of the rollers and severing the stalks below the ears, substantially as specified.

EDMUND W. QUINCY.

Witnesses:
ALBERT H. ADAMS,
O. W. BOND.